April 19, 1938.    G. A. FOISY    2,114,443
POWER TRANSMISSION
Filed March 12, 1936
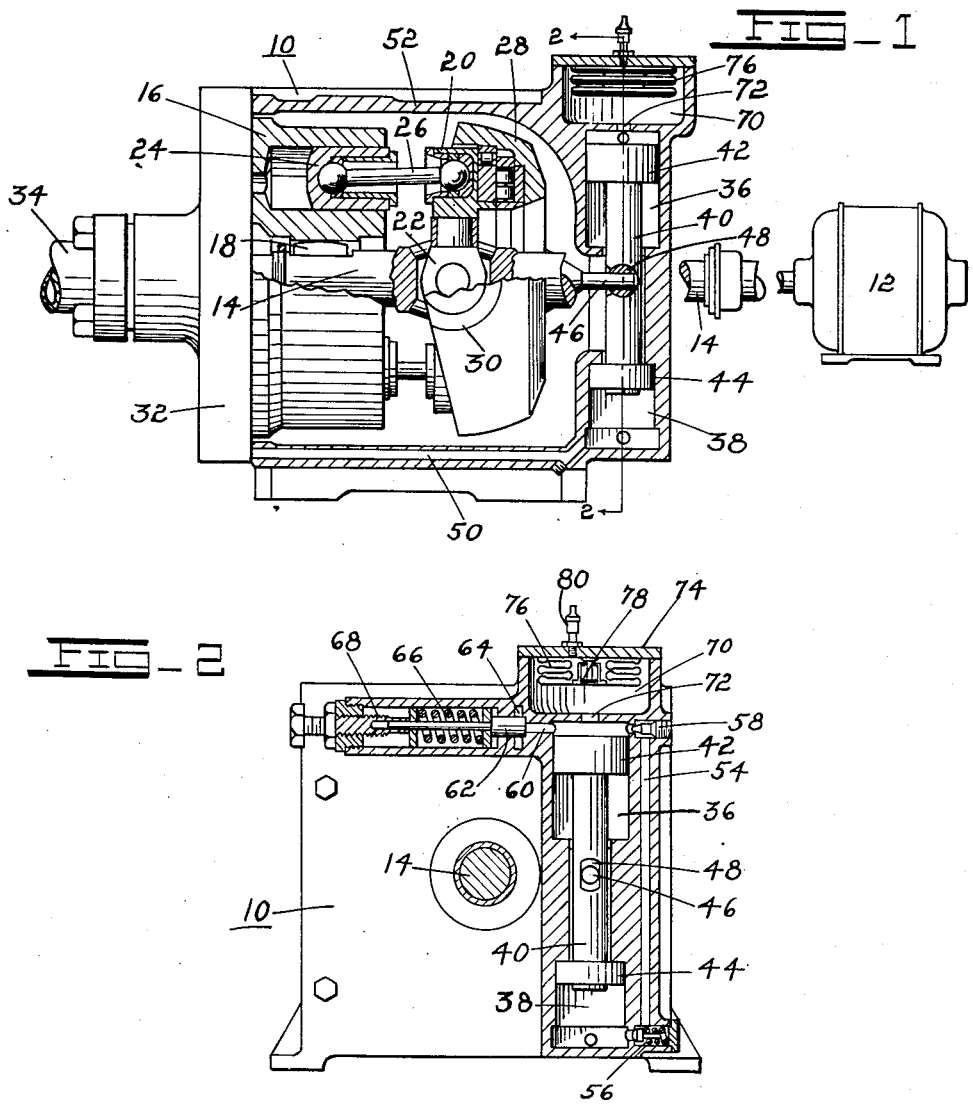
INVENTOR
GEORGE A. FOISY
BY
ATTORNEY Patented Apr. 19, 1938

2,114,443

UNITED STATES PATENT OFFICE 2,114,443

POWER TRANSMISSION

George A. Foisy, New Haven, Conn., assignor to The Waterbury Tool Company, Waterbury, Conn., a corporation of Connecticut

REISSUED
APR 1 - 1941

Application March 12, 1936, Serial No. 68,433

7 Claims. (Cl. 103—38)

This invention relates to power transmission devices and more particularly to those of the fluid type utilizing a variable displacement pump. It is an object of the invention to provide a variable speed fluid power transmission wherein a variable displacement pump is incorporated and in which means are provided for varying the displacement of the pump for automatically maintaining a constant fluid pressure in the discharge line from the pump.

A further object is to provide a displacement regulator for a variable displacement pump wherein fluid pressure motor means is utilized for operating the displacement varying mechanism under the control of a small pressure responsive pilot valve.

A further object is to provide a control of this character which has a rapid response to sudden changes of operating conditions and which employs simple and reliable mechanism which is economical in cost.

Further objects and advantages of the present invention will be apparent from the following description, reference being had to the accompanying drawing wherein a preferred form of the present invention is clearly shown.

In the drawing:

Fig. 1 is a longitudinal cross sectional view of a variable displacement pump embodying a preferred form of the present invention.

Fig. 2 is a cross section on line 2—2 of Fig. 1.

The present invention is shown as incorporated in a variable displacement pump adapted to form a part of a variable speed fluid power transmission. The pump 10 is illustrated as of the well-known "Waterbury" type, although it will be understood that the invention may be applied to variable displacement pumps or motors, of any construction. A motor 12 drives a shaft 14 of the pump 10 which in turn rotates a cylinder barrel 16 through the medium of keys 18 and also rotates a socket ring 20 through the medium of a universal joint 22. Pistons 24 reciprocate in the bores of the cylinder barrel 16 and are articulated to the socket ring 20 by means of ball-ended connecting rods 26. The socket ring 20 is journalled in a tilting box 28 pivotally mounted on trunnions 30 for a limited movement clockwise from the position illustrated in Fig. 1.

The stroke of the pistons 24 and consequently the displacement of the pump may be varied by moving the tilting box 28 on its trunnions 30. Thus, if the tilting box be maintained in the position illustrated, that is, with the plane of the socket ring 20 perpendicular to the shaft 14, the pistons 24 will have zero stroke while if the tilting box 28 be tilted clockwise to its full movement, the stroke of the pistons 24 will be at maximum.

Fluid is delivered to and from the cylinder bores through suitable ports in a valve plate 32 to which supply and return conduits 34 are connected. These conduits may be connected to any desired load device such, for example, as a fixed displacement fluid motor of a construction similar to the pump 10 except that the angle of its socket ring is maintained fixed. Alternatively, conduits 34 may be connected to any fluid circuit in which it is desired to maintain a variable delivery of fluid at a constant pressure.

The mechanism thus far described is well known in the art by itself and forms no part of the present invention.

In order to regulate the position of the tilting box 28 and consequently the displacement of the pump 10, there is provided a pair of aligned cylinder bores 36 and 38, the bore 36 having a somewhat larger diameter than the bore 38. A sliding control member 40 carries pistons 42 and 44 at its opposite ends which are a fluid tight, sliding fit within the bores 36 and 38 respectively. The control member 40 is connected to operate the tilting box 28 by means of an arm 46 rigidly secured to the tilting box having a sliding and pivotal connection with the control member 40 at 48.

The space below the piston 44 in the cylinder bore 38 communicates by means of a passage 50 with the delivery port of the valve plate 32, this passage being permanently open and unrestricted. The space above the piston 44 in bore 38 and below the piston 42 in bore 36 communicates with the interior of pump casing 52 through an ample clearance space around the control member 40. A conduit 54 connects the lower end of cylinder bore 38 with the upper end of cylinder bore 36 and has a check valve 56 at one end and an adjustable restriction 58 at the other end. Communicating with the upper end of the bore 38 is a bleeder passage 60 which is under the control of a valve 62 for varying the quantity of fluid passing from the passage 60 to a chamber 64 which opens to the interior of the casing 52. Valve 62 is biased to the right in Fig. 2 by a spring 66 which is adjustable by means of a screw threaded abutment member 68.

Above the piston 42 there is formed a chamber 70 which is in communication with the upper end of the cylinder 36 at all times through an opening 72. A cover 74 closes the upper end of the chamber 70 and carries a bellows 76 and stop means 78 limiting its expansion. A connection 80 is provided for filling the interior of the bellows 76 with compressed air or other elastic fluid medium.

In operation of the device, the pump 10 being connected to a suitable load device which requires the delivery of fluid at variable rates of flow and at constant pressure; the motor 12 is started and the cylinder barrel 16 and socket ring 20 thus caused to rotate at a constant speed. The pressure maintained in the delivery port of the valve plate 32 is transferred to the piston 44 through the conduit 50. A counter-balancing pressure is maintained on top of the piston 42 by a small quantity of fluid flowing through the conduit 54 to the upper end of the cylinder bore 36. This quantity is initially regulated by the adjustable restriction 58 which, when once set, may remain fixed thereafter. The spring 66 is adjusted by means of the adjustable abutment 68 to open the bleeder passage 60 to the pump casing through passage 64, at a pressure somewhat under the pressure which it is desired to maintain in the discharge conduit.

When the pressure is maintained at the desired value in the discharge conduit and the quantity of fluid taken by the load device is constant, the control member 40 will be maintained in a position such that the displacement of the pump 10 is equal to the quantity required by the load device. Under these conditions, the valve 62 will be maintained open to a degree just sufficient to pass the same quantity of fluid which is permitted to pass the restriction 58. Thereafter when the quantity of fluid taken by the load device decreases, the first effect is to build up a slightly increased pressure in the delivery port of valve plate 32 since the displacement of the pump momentarily remains fixed at a greater value than the quantity taken by the load device. This increased pressure is transmitted through the conduit 50 to the piston 44 which in turn transmits the increase in pressure to the fluid above the piston 42, thus opening the valve 62 wider to bleed more fluid to the interior of the casing 52. Under these conditions the control member 40 is permitted to move upwardly and decrease the displacement of the pump 10 since fluid is now being discharged from the upper end of the cylinder bore 36 at a greater rate than it is entering through the restriction 58. As soon as this action has taken place sufficiently to bring the pump displacement down to the value required by the load device, the pressure in the outlet port of the valve plate 32 reaches its normal value and conditions again become equalized.

During the operation just described, the bellows 76 which has been previously filled with compressed air or other elastic medium at a pressure substantially equal to the normal operating pressure of the pump is maintained in the collapsed position illustrated, by the fluid pressure within the chamber 70. When the quantity of fluid required by the load device increases necessitating an increase in the displacement of the pump 10, the pressure at first falls off, in the discharge port of the valve plate 32. The elastic fluid within the bellows 76 is thereby permitted to expand, forcing fluid out of the chamber 70 and driving the control member 40 downwardly to displace fluid from the cylinder bore 38 until such time as the displacement of the pump has been increased to the new value required by the load device.

During this operation the check valve 56 acts to prevent the back flow of fluid through the conduit 54, which would otherwise occur due to the excess pressure in the bore 36 over that in the bore 38. Likewise, the slight drop in pressure necessary for the bellows 76 to expand permits the valve 62 to close the bleeder passage 60 from the cylinder 36. It will thus be seen that the response of the device to sudden changes in flow requirements may be made very sensitive since movement of the control member 40 is under the primary influence of the valve 62 which may be light and free acting. Likewise, the response is rapid in either direction of movement since the bellows 76 acts to maintain pressure on the piston 42 under all conditions. Thus, for example, were the pump operating at a small displacement and were the load requirements suddenly increased to a value corresponding to maximum displacement of the pump 10, the discharge pressure would fall off rapidly. Were it not for the elastic action of the bellows 76, the response of the pump under these conditions will be somewhat delayed due to the lack of suitable operating pressure for moving the control member 40.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device the combination of means for varying the effective displacement of the device, a pair of oppositely acting, normally balanced, pressure responsive means including a pair of differential pistons operatively associated with the displacement varying means, conduits connecting both pressure responsive means with one side of the working circuit of the translating device, and means including a resiliently biased valve and a fixed restriction one of which controls the inlet to the larger piston and the other of which controls the outlet therefrom, said valve being responsive to a predetermined increase or decrease in the operating fluid pressure on said pressure responsive means, for unbalancing said means in a manner to move the displacement varying means in the direction tending to counteract said change, whereby the displacement varying means may be brought to and maintained stably in the position corresponding to any load requirement.

2. In a fluid pressure energy translating device the combination of means for varying the effective displacement of the device, a pair of oppositely acting, normally balanced, pressure responsive means including a pair of differential pistons operatively associated with the displacement varying means, conduits connecting both pressure responsive means with one side of the working circuit of the translating device, means including a resiliently biased valve and a fixed restriction one of which controls the inlet to the larger piston and the other of which controls the outlet therefrom, said valve being responsive to a predetermined increase or decrease in the operating fluid pressure on said pressure responsive means for unbalancing said means in a manner to move the displacement varying means in the direction tending to counteract said change, and means for maintaining substantially normal pressure on at least one of said pressure responsive means when the operating fluid pressure in said device tends to fall off suddenly, whereby the normal quick response of the pressure responsive means is maintained regardless of pressure conditions in said circuit.

3. In a variable displacement pump the combination of means for varying the effective displacement of the pump, a pair of differential pistons for operating said means, a conduit connecting each of said pistons with the outlet of the pump, the conduit to the smaller piston being unobstructed, a conduit for bleeding fluid from the larger piston, a valve responsive to pressure changes on said differential pistons and arranged to control the bleeding of fluid from the larger piston, a fixed restriction in the conduit between the outlet of the pump and the larger piston and resilient, fluid displacing, means for maintaining pressure on the larger piston when the outlet pressure of the pump tends to fall off suddenly, whereby the normal quick response of the pressure responsive means is maintained regardless of pressure conditions in said circuit.

4. In a variable displacement pump the combination of means for varying the effective displacement of the pump, a pair of differential pistons for operating said means, a conduit connecting each of said pistons with the outlet of the pump, the conduit to the smaller piston being unobstructed, a conduit for bleeding fluid from the larger piston, a valve responsive to changes in the pressure effective on said differential pistons, a fixed restriction, one of which is located in the inlet conduit to the larger piston and the other of which is located in the outlet conduit from the larger piston, and an air chamber for maintaining pressure on the larger piston when the outlet pressure of the pump tends to fall off suddenly, whereby the normal quick response of the pressure responsive means is maintained regardless of pressure conditions in said circuit.

5. In a variable displacement pump the combination of means for varying the effective displacement of the pump, a pair of differential pistons for operating said means, a conduit connecting each of said pistons with the outlet of the pump, the conduit to the smaller piston being unobstructed, a conduit for bleeding fluid from the larger piston, a valve responsive to changes in the pressure effective on said differential pistons, and a fixed restriction, one of which is located in the inlet conduit to the larger piston and the other of which is located in the outlet conduit from the larger piston, an air chamber for maintaining pressure on the larger piston when the outlet pressure of the pump tends to fall off suddenly, and an imperforate flexible wall separating the air chamber from the fluid effective on the larger piston, whereby the normal quick response of the pressure responsive means is maintained regardless of pressure conditions in said circuit.

6. In a variable displacement pump the combination of means for varying the effective displacement of the pump, a pair of differential pistons for operating said means, a conduit connecting each of said pistons with the outlet of the pump, the conduit to the smaller piston being unobstructed, a conduit for bleeding fluid from the larger piston, a valve responsive to changes in the pressure effective on said differential pistons, and a fixed restriction, one of which is located in the inlet conduit to the larger piston and the other of which is located in the outlet conduit from the larger piston, said pistons acting to take up a stable position whereby the pump displacement is automatically adjusted to the value corresponding to any requirement made on the pump, and energy-storing means for maintaining pressure on the larger piston when the outlet pressure of the pump tends to fall off suddenly, whereby the normal quick response of the differential pistons is maintained regardless of pressure fluctuations in the outlet of the pump.

7. In a variable displacement pump having a horizontal drive shaft projecting centrally from one side thereof, the combination of means for varying the effective displacement of the pump, a pair of differential pistons extending perpendicularly to said shaft at one side thereof for operating said means, a conduit connecting each of said pistons with the outlet of the pump, the conduit to the smaller piston being unobstructed, a conduit for bleeding fluid from the larger piston, a valve responsive to pressure changes on said differential pistons and arranged to control the bleeding of fluid from the larger piston, a fixed restriction in the conduit between the outlet of the pump and the larger piston and resilient, fluid displacing, means for maintaining pressure on the larger piston when the outlet pressure of the pump tends to fall off suddenly, whereby the normal quick response of the pressure responsive means is maintained regardless of pressure conditions in said circuit.

GEORGE A. FOISY.